United States Patent
Huang et al.

(10) Patent No.: US 11,668,999 B2
(45) Date of Patent: Jun. 6, 2023

(54) OPTICAL IMAGING APPARATUS

(71) Applicant: LUXVISIONS INNOVATION LIMITED, New Territories (HK)

(72) Inventors: Hai-Jo Huang, New Territories (HK); Chiang-Yuan Chuang, New Territories (HK); Cheng-Te Tseng, New Territories (HK); Shang-Chieh Chien, New Territories (HK)

(73) Assignee: GUANGZHOU LUXVISIONS INNOVATION TECHNOLOGY LIMITED, Science City (CN)

( * ) Notice: Subject to any disclaimer, the term of this patent is extended or adjusted under 35 U.S.C. 154(b) by 261 days.

(21) Appl. No.: 16/992,627

(22) Filed: Aug. 13, 2020

(65) Prior Publication Data
US 2020/0371409 A1 Nov. 26, 2020

Related U.S. Application Data

(60) Provisional application No. 62/886,376, filed on Aug. 14, 2019.

(30) Foreign Application Priority Data

Jun. 9, 2020 (TW) ................................. 109119369

(51) Int. Cl.
*G03B 17/17* (2021.01)
*G03B 13/34* (2021.01)
*G03B 5/04* (2021.01)
(52) U.S. Cl.
CPC .............. *G03B 17/17* (2013.01); *G03B 5/04* (2013.01); *G03B 13/34* (2013.01); *G03B 2205/0015* (2013.01); *G03B 2205/0046* (2013.01)

(58) Field of Classification Search
CPC . G03B 17/17; G03B 13/34; G03B 2205/0015
See application file for complete search history.

(56) References Cited

U.S. PATENT DOCUMENTS

| 11,314,147 | B1* | 4/2022 | Sharma | H04N 5/2253 |
|---|---|---|---|---|
| 2005/0007678 | A1* | 1/2005 | Sueyoshi | G02B 15/145113 |
| | | | | 359/683 |
| 2013/0278785 | A1* | 10/2013 | Nomura | G02B 27/646 |
| | | | | 348/208.11 |
| 2014/0002912 | A1* | 1/2014 | Ishikawa | G02B 13/009 |
| | | | | 359/813 |
| 2015/0316748 | A1* | 11/2015 | Cheo | G02B 7/005 |
| | | | | 359/694 |
| 2018/0024329 | A1* | 1/2018 | Goldenberg | H04N 5/23258 |
| | | | | 359/557 |
| 2019/0235202 | A1* | 8/2019 | Smyth | G03B 17/17 |
| 2021/0026117 | A1* | 1/2021 | Yao | G02B 13/004 |

* cited by examiner

*Primary Examiner* — Clayton E. LaBalle
*Assistant Examiner* — Diana Hancock
(74) *Attorney, Agent, or Firm* — Birch, Stewart, Kolasch & Birch, LLP (57) ABSTRACT

An optical imaging apparatus includes a plurality of optical lenses. The optical lenses are arranged along an optical axis to capture an image in an image capture direction and project the image on an imaging plane. The plurality of optical lenses are divided into at least one fixed lens set and at least one movable lens set. The fixed lens set is fixedly disposed, and the movable lens set is configured to move relative to the fixed lens set, so as to adjust focal lengths of the optical lenses.

11 Claims, 13 Drawing Sheets

OPTICAL IMAGING APPARATUS

CROSS-REFERENCES TO RELATED APPLICATIONS

This application claims the priority benefit of U.S. provisional application Ser. No. 62/886,376, filed on Aug. 14, 2019 and Patent Application No. 109119369 filed in Taiwan, R.O.C. on Jun. 9, 2020. The entirety of the above-mentioned patent applications are hereby incorporated by references herein and made a part of the specification.

BACKGROUND

Technical Field

This disclosure relates to configuration of optical lens sets, and in particular, to an optical imaging apparatus.

Related Art

Figure 1:
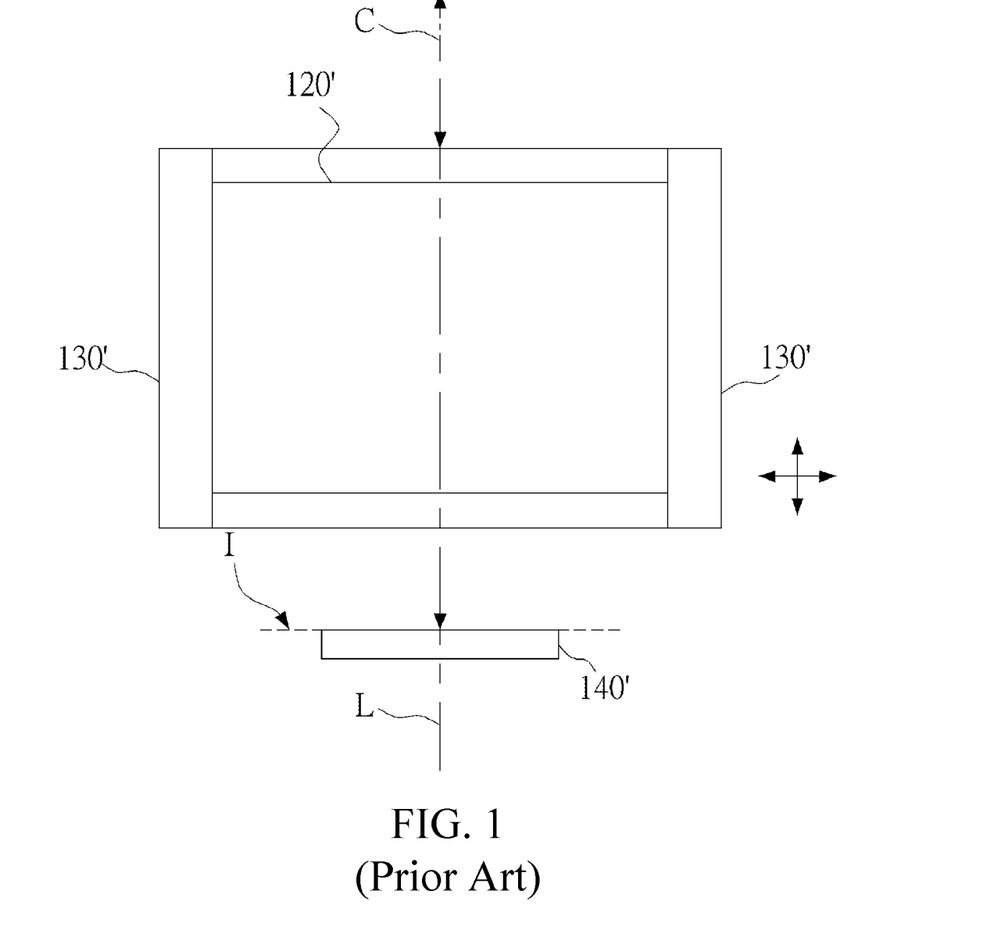
FIG. 1 is a schematic top view of a photographing apparatus in the art.
Figure 2:
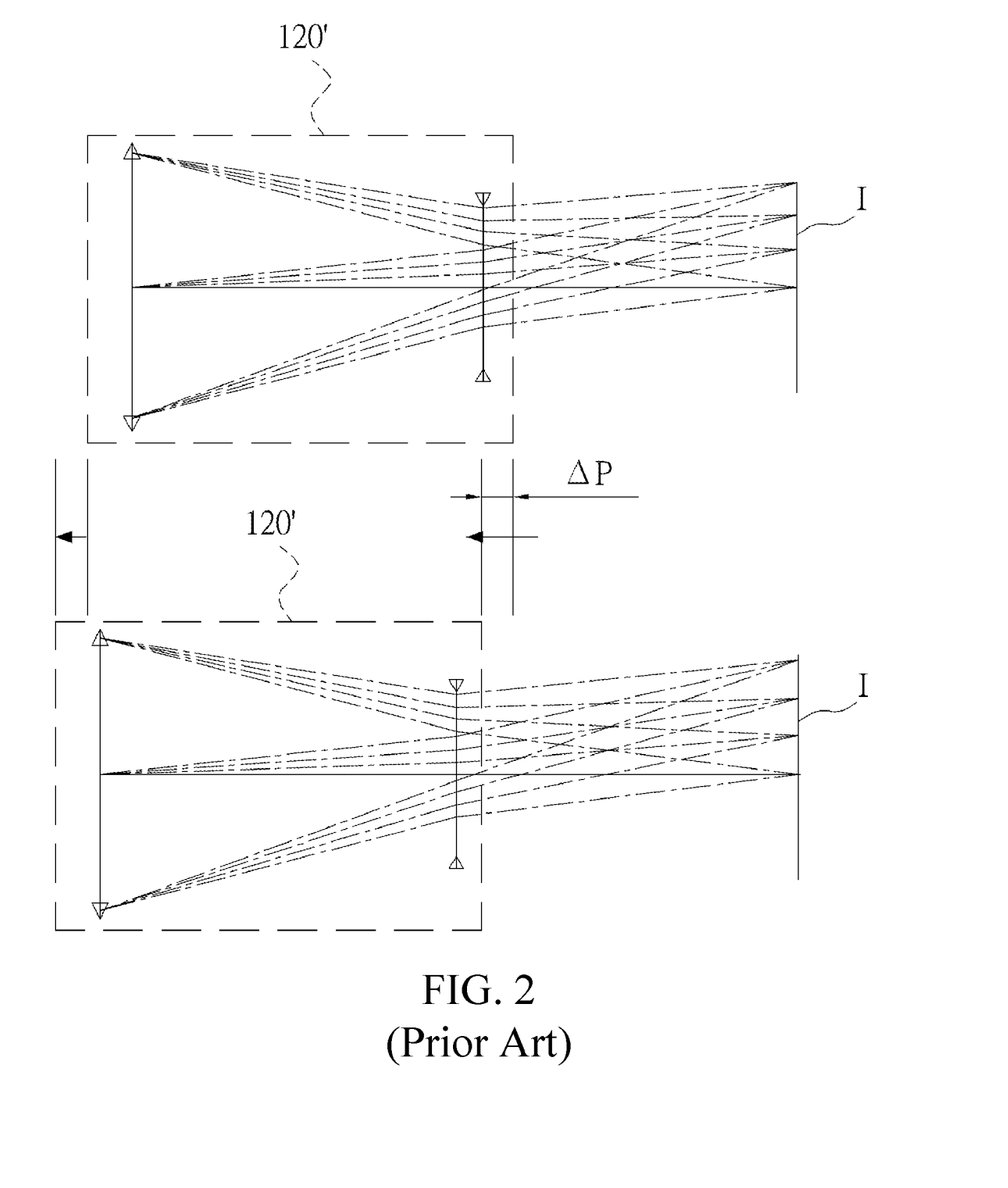
FIG. 2 is a schematic diagram of focusing through movement of an optical lens set in the art.

As shown in FIG. 1 and FIG. 2, an optical lens set of a photographing apparatus is composed of a plurality of optical lenses sequentially arranged along an optical axis L, to obtain a longer effective focal length (EFL) within a limited space for projecting an image on an imaging plane I. The imaging plane I is a hypothetical plane that an image sensor 140' is located thereon. The optical lenses of the optical lens set are usually fixed on a lens frame to form a single optical lens set 120'.

As shown in FIG. 1 and FIG. 2, when an object distance changes, the optical lens set 120' needs to be moved forward and backward to change a back focal length to focus on the object, so that objects with different object distances can be clearly imaged on the imaging plane I. Alternatively, when the photographing apparatus is unstable, the optical lens set 120' is moved upward, downward, leftward, and rightward for optical image stabilization (OIS). The optical lens set 120' consisting of the plurality of optical lenses is heavy and requires a voice coil motor (VCM) or other actuators 130' with a relatively large size to drive movement. Portable electronic devices such as smartphones or tablet computers, etc. are generally relatively light and thin and have a limited internal space. The large-sized actuator 130' takes up space, impeding disposing of the optical lens set 120' in the portable electronic device with a limited space. In addition, the actuator 130' with a large driving force consumes relatively large driving currents, resulting in relatively large power losses.

SUMMARY

In view of the above problems, this disclosure proposes an optical imaging apparatus to reduce a magnitude of a driving force required for adjusting optical characteristics.

In at least one embodiment of this disclosure, the optical imaging apparatus includes a plurality of optical lenses. The plurality of optical lenses are arranged along an optical axis to capture an image in an image capture direction and project the image on an imaging plane.

The plurality of optical lenses are divided into at least one fixed lens set and at least one movable lens set. The fixed lens set is fixedly disposed, and the movable lens set is configured to move relative to the at least one fixed lens set.

In at least one embodiment, the movable lens set is configured to move forward and backward on the optical axis relative to the fixed lens set.

In at least one embodiment, the movable lens set is configured to move on a plane perpendicular to the optical axis relative to the fixed lens set.

In at least one embodiment, the optical imaging apparatus further includes an image sensor located on the imaging plane.

In at least one embodiment, the optical imaging apparatus further includes a filter located between the optical lenses and the image sensor.

In at least one embodiment, the optical imaging apparatus further includes a fixing frame, and the image sensor and the filter are disposed on the fixing frame.

In at least one embodiment, the optical imaging apparatus further includes an actuator connected to the movable lens set and configured to drive the movable lens set to move relative to the fixed lens set.

In at least one embodiment, the optical imaging apparatus further includes a second lens frame configured to carry the movable lens set, and the actuator is connected to the second lens frame.

In at least one embodiment, the optical imaging apparatus further includes a first lens frame configured to carry the fixed lens set.

In at least one embodiment, the actuator is a voice coil motor, a shape memory alloy motor, a piezoelectric motor, or a combination of two or more thereof.

In at least one embodiment, the optical imaging apparatus further includes an optical path changing element located in the image capture direction of the optical lenses and configured to change a light beam from travelling in a direction parallel to an actual image capture direction to travelling in a direction parallel to the image capture direction.

In at least one embodiment, the optical path changing element is a reflective sheet, and an included angle is defined between the reflective sheet and the image capture direction.

In at least one embodiment, the optical path changing element is a prism, and the prism includes a light incident surface and a light emitting surface, the light incident surface faces the actual image capture direction, the light emitting surface faces the optical lenses, and an included angle is defined between the light incident surface and the light emitting surface.

In at least one embodiment, the optical imaging apparatus includes two or more of the fixed lens sets, and each of the fixed lens sets has a different effective focal length.

In at least one embodiment, the optical imaging apparatus includes two or more of the moveable lens sets, and each of the moveable lens sets has a different effective focal length.

In this disclosure, the plurality of optical lenses are divided into a plurality of sets. During adjustment of optical characteristics, for example, focusing, zooming, and optical image stabilization, only the movable lens set in the plurality of optical lenses is moved. A weight of the movable lens set or a movement displacement required for the adjustment of the optical characteristics is less than a weight of the entire optical lens set or an entire required movement displacement. Therefore, a driving force that the actuator needs to provide for moving the movable lens set is less than a driving force required for moving the entire optical lens set, so that a size of the actuator can be effectively reduced, thereby reducing an overall size and an overall weight of the optical imaging apparatus. In addition, because the driving force that the actuator needs to provide is reduced, a driving current required by the actuator can also be reduced, relieving power consumption of the optical imaging apparatus.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 3:
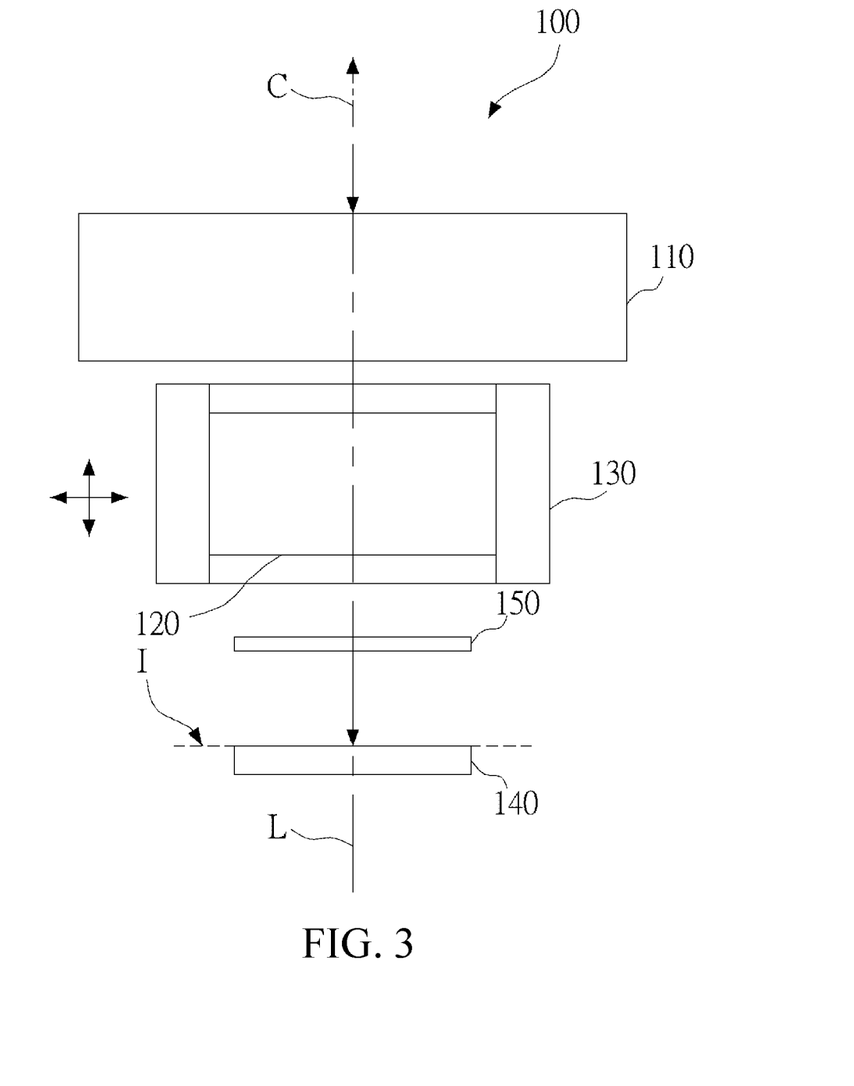
FIG. 3 is a schematic top view of an optical imaging apparatus according to a first embodiment of this disclosure.
Figure 4:
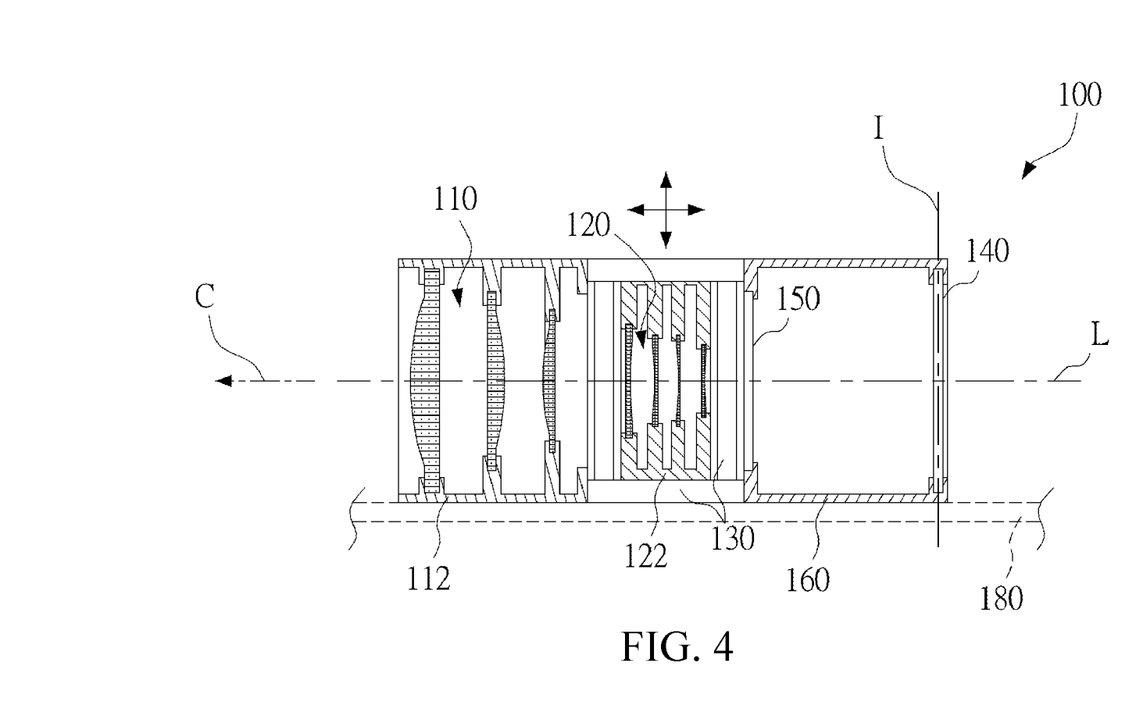
FIG. 4 is a schematic cross-sectional view of an optical imaging apparatus according to the first embodiment of this disclosure.

FIG. 3 and FIG. 4 show an optical imaging apparatus 100 disclosed in a first embodiment of this disclosure. The optical imaging apparatus 100 is configured to capture an image in an image capture direction C and project the image on an imaging plane I. The imaging plane I is a hypothetical plane.

Referring to FIG. 3 and FIG. 4, the optical imaging apparatus 100 includes a plurality of optical lenses, an actuator 130, an image sensor 140, and a filter 150. The optical imaging apparatus 100 is disposed in an electronic device. The electronic device may be, but is not limited to, a smartphone, a tablet computer, a notebook computer, a display device, or a camera.

As shown in FIG. 3 and FIG. 4, a plurality of optical lenses are arranged along an optical axis L to capture an image in the image capture direction C and project the image on the imaging plane I. The plurality of optical lenses are divided into one or more fixed lens sets 110 and one or more movable lens sets 120. In the first embodiment, one fixed lens set 110 and one movable lens set 120 are used as examples for description, but the numbers of the fixed lens sets 110 and the movable lens sets 120 may vary arbitrarily.

As shown in FIG. 3 and FIG. 4, the fixed lens set 110 is fixedly disposed, and the movable lens set 120 is configured to move with respect to the fixed lens set 110. In the first embodiment, the movable lens set 120 is configured between the fixed lens set 110 and the imaging plane I, to change back focal lengths from the plurality of optical lenses to the imaging plane I, so as to focus on objects with different object distances for clearly imaging on the imaging plane I. However, this disclosure does not exclude transposition of the fixed lens set 110 and the movable lens set 120. In other words, arrangement order of the fixed lens set 110 and the movable lens set 120 on the optical axis L is not limited, and may vary arbitrarily.

As shown in FIG. 3 and FIG. 4, relative to the fixed lens set 110, the movable lens set 120 may be moved forward and backward on the optical axis L, or may be moved upward, downward, leftward, and rightward on a plane perpendicular to the optical axis L. A direction in which the movable lens set 120 is moved relative to the fixed lens set 110 depends on a function to be performed. When focusing, the movable lens set 120 is moved forward and backward on the optical axis L relative to the fixed lens set 110. When performing optical image stabilization, the movable lens set 120 is moved upward, downward, leftward, and rightward on the plane perpendicular to the optical axis L relative to the fixed lens set 110. Certainly, the two functions may be simultaneously performed so that the movable lens set 120 moves along three axes.

As shown in FIG. 3, the image sensor 140 and the filter 150 constitute an image sensing module. The image sensor 140 is located on the imaging plane I, so that images of the plurality of optical lenses fall on the image sensor 140. The image sensor 140 captures images and performs encoding to generate an image signal. The filter 150 is located between the optical lenses and the image sensor 140 to adjust wavelength distribution of a light beam entering the image sensor 140.

As shown in FIG. 3 and FIG. 4, the actuator 130 is directly or indirectly connected to the movable lens set 120, so that the movable lens set 120 and the actuator 130 form an adjustment module. The actuator 130 is configured to drive the movable lens set 120 to move relative to the fixed lens set 110, so as to perform focusing or optical image stabilization. The actuator 130 may be, but is not limited to, a voice coil motor (VCM), a shape memory alloy (SMA), a piezoelectric motor, or a combination of two or more thereof. In addition, for example, in a voice coil motor, a number of coils may be configured according to requirements, so that the movable lens set 120 can be moved along a single axis on the optical axis L for focusing and linearly moved along two axes in a direction perpendicular to the optical axis L to achieve optical image stabilization, or can be linearly moved along three axes simultaneously to achieve focusing and optical image stabilization. In addition to linear movement along three axes, the movable lens set 120 may also be appropriately inclined or rotated to correct the optical axis L through different configuration of driving displacements on opposite two sides of the movable lens set 120.

As shown in FIG. 4, the fixed lens set 110, the actuator 130, the filter 150, and the image sensor 140 are directly or indirectly fixed to a base 180, so that the fixed lens set 110, the adjustment module, and the image sensing module can be assembled and connected in sequence. The base 180 may be a substrate, such as a printed circuit board, so that the optical imaging apparatus 100 forms a single module to facilitate installation in an electronic device. The base 180 may also be a part of a housing 300 of the electronic device.

Referring to FIG. 4 again, the optical imaging apparatus 100 may further include a first lens frame 112, a second lens frame 122, and a fixing frame 160. The first lens frame 112 and the fixing frame 160 are disposed on the base 180, the first lens frame 112 carries the fixed lens set 110, and the image sensor 140 and the filter 150 are fixed on the fixing frame 160, so that the fixed lens set 110, the filter 150, and the image sensor 140 are indirectly fixed to the base 180. The second lens frame 122 carries the movable lens set 120, and the actuator 130 is connected to the second lens frame 122 and fixed to the base 180, so that the movable lens set 120 is indirectly connected to the actuator 130. The fixing structure is merely an example, and this disclosure is not limited to disposing the optical lenses, the actuator 130, and the image sensor 140 by using the above fixing structure. In some embodiments, the optical imaging apparatus 100 includes a lens barrel, and the fixed lens set 110, the movable lens set 120, and the actuator 130 that are disposed in the lens barrel. In some embodiments, the fixed lens set 110 is disposed in a lens barrel, the movable lens set 120 and the actuator 130 are disposed in another lens barrel, and the two lens barrels are connected to each other.

Figure 5:
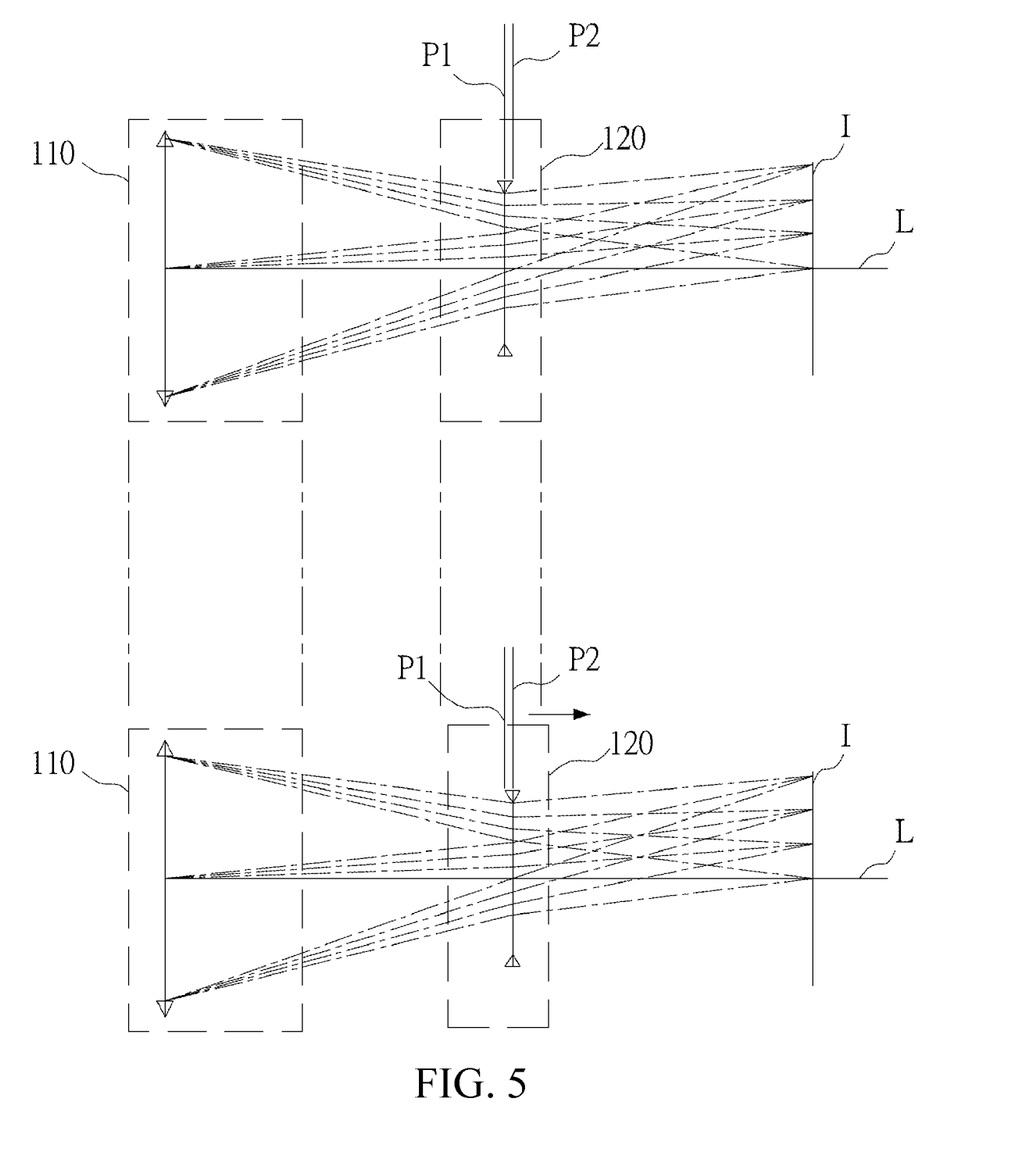
FIG. 5 is a schematic diagram of focusing by an optical imaging apparatus according to the first embodiment of this disclosure.

As shown in FIG. 4 and FIG. 5, generally, numbers of optical lenses in the fixed lens set 110 and the movable lens set 120 are designed to minimize a weight of the movable lens set 120, so that merely a relatively small driving force can drive the movable lens set 120 to move, so that a size of the actuator 130 can be effectively reduced. Generally, sizes of a plurality of optical lenses in an optical lens set with a long focal length sequentially decrease, so that an optical lens at an imaging end has a relatively small weight. In this case, an optical lens close to the imaging plane I may be selected as the movable lens set 120, so that the movable lens set 120 is located between the fixed lens set 110 and the imaging plane I, and the movable lens set 120 has a weight less than a weight of the fixed lens set 110. Such selection of the movable lens set 120 is merely one of the solutions, and is not intended to limit the selection of the movable lens set 120 in this disclosure.

As shown in FIG. 5, when the optical lens set needs to perform focusing, for example, when a photographing distance is changed from infinity to a short range, a back focal length from the optical lens set to the imaging plane I needs to be changed to complete focusing to obtain a clear image through imaging. In the optical imaging apparatus 100 in one or more embodiments of this disclosure, in order to change the back focal length for focusing, only the movable lens set 120 needs to be moved without moving the entire optical lens set. Since the optical lens number and occupied space of the movable lens set 120 are less than the optical lens number and occupied space of the entire optical lens set, the weight and the size of the actuator 130 can both be reduced, and the driving current required by the actuator 130 can also be reduced.

Comparison is performed by using FIG. 2 as the prior art and FIG. 5 as an example of this disclosure. An effective focal length (EFL) of the movable lens set 120 is actually smaller than an effective focal length of the entire optical lens set. For achievement of the equivalent focusing effect, a movement displacement (a change amount of the back focal length) required for the movable lens set 120 to move from a first position P1 to a second position P2 is less than an initial movement displacement ΔP required for the entire optical lens set for focusing.

In a small-sized portable electronic device, such as a mobile phone with a photographing function or a portable photographing apparatus, the imaging apparatus usually has five to eight optical lenses. Effective focal lengths of the optical lenses are 20 mm to 35 mm. According to the optical imaging apparatus 100 proposed in this disclosure, the movable lens set 120 may be designed to consist of three to four optical lenses, and the effective focal length of the movable lens set 120 is designed to be less than 20 mm to 35 mm. In this case, a movement displacement required for moving the movable lens set 120 for focusing can be reduced.

Referring to FIG. 2 and FIG. 5, for example, when the effective focal length of the optical lens set is 26.6 mm, and an object distance needs to be changed from infinity to a distance of 1.2 m, the initial movement displacement ΔP required for moving the entire optical lens set for focusing is 0.619 mm. If the optical lens set still has an effective focal length of 26.6 mm, but is divided into a fixed lens set 110 with an effective focal length of 13.311 mm and a movable lens set 120 with an effective focal length of −8.213 mm shown in FIG. 5, only the movable lens set 120 needs to be moved for focusing, and the movement displacement required for the movable lens set 120 to move from the first position P1 to the second position P2 can be reduced to 0.2 mm.

Figure 6:
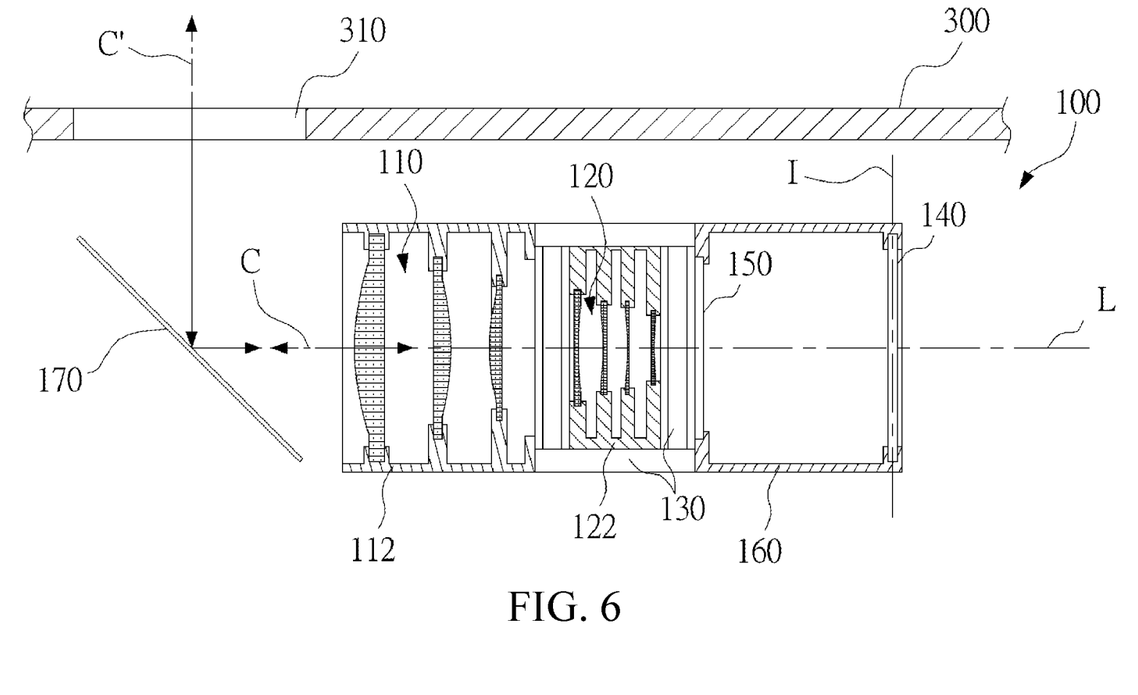
FIG. 6 is a schematic cross-sectional view of an optical imaging apparatus according to a second embodiment of this disclosure.
Figure 7:
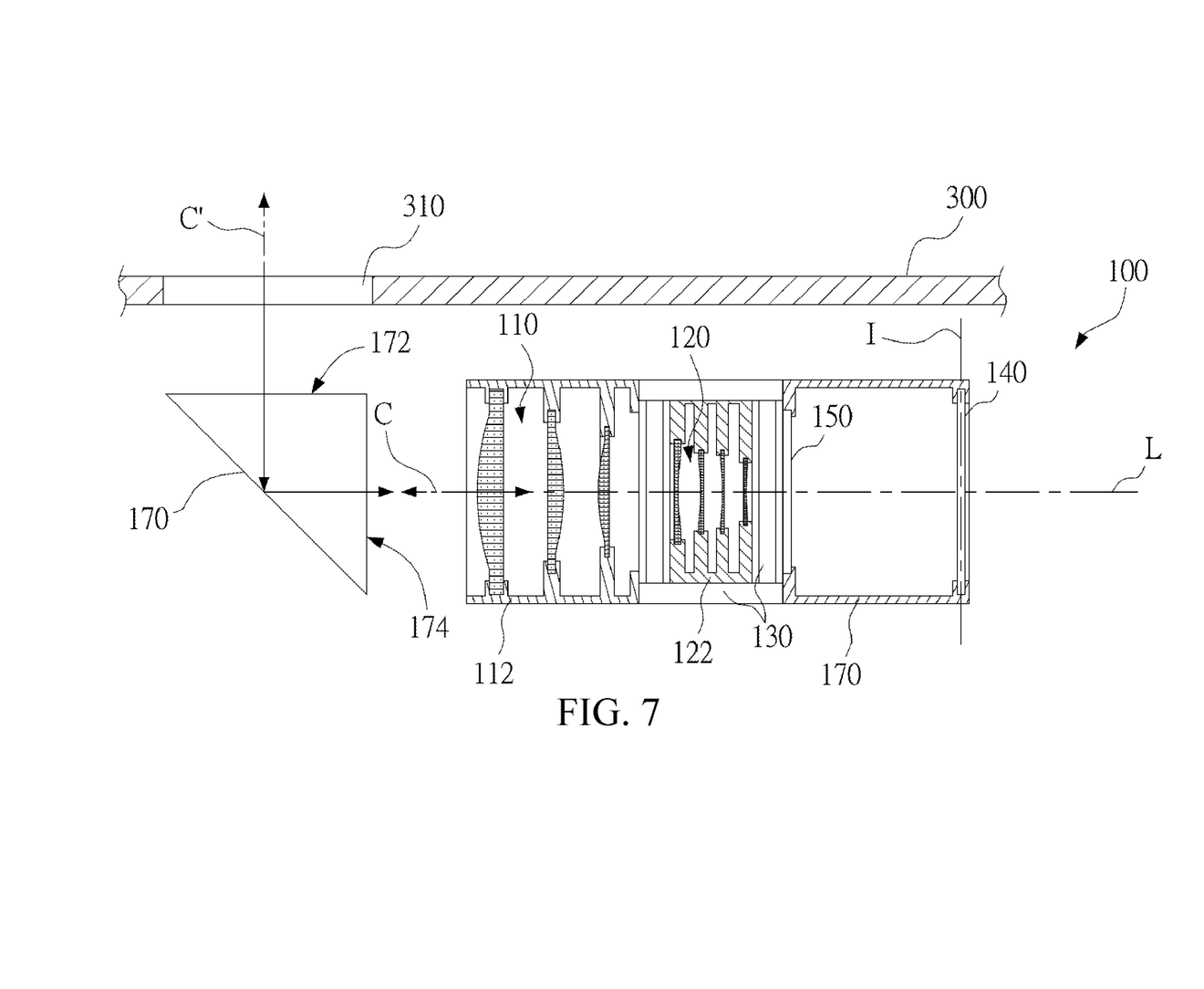
FIG. 7 is a schematic cross-sectional view of another optical imaging apparatus according to the second embodiment of this disclosure.

FIG. 6 and FIG. 7 show an optical imaging apparatus 100 disclosed in a second embodiment of this disclosure. A difference between the second embodiment and the first embodiment lies in that the optical imaging apparatus 100 in the second embodiment further includes an optical path changing element 170 located in the image capture direction C of the optical lenses and configured to change a light beam from travelling in a direction parallel to an actual image capture direction C' to travelling in a direction parallel to the image capture direction C. In other words, the optical imaging apparatus 100 may be configured as a periscope structure, so that the optical axes L of the optical lenses do not need to be arranged along a thickness direction of an electronic device, facilitating application in thin and light electronic devices.

As shown in FIG. 6, in one specific embodiment, the optical path changing element 170 is a reflective sheet; an included angle is defined between the reflective sheet and the image capture direction C. The included angle between the image capture direction C and the reflective sheet and an included angle between the actual image capture direction C' and the reflective sheet are set to be the same, so that a light beam travelling through a window 310 of the housing 300 of the electronic device can be reflected by reflective sheet to change a travelling direction and then pass through the fixed lens set 110 and the movable lens set 120 to project an image on the image sensor 140.

As shown in FIG. 7, in one specific embodiment, the optical path changing element 170 is a prism. The prism has a light incident surface 172 and a light emitting surface 174. The light incident surface 172 faces the actual image capture direction C', the light emitting surface 174 faces the plurality of optical lenses, and an included angle is defined between the light incident surface 172 and the light emitting surface 174 to change a light beam from travelling along the actual image capture direction C' to travelling along the image capture direction C.

Figure 8:
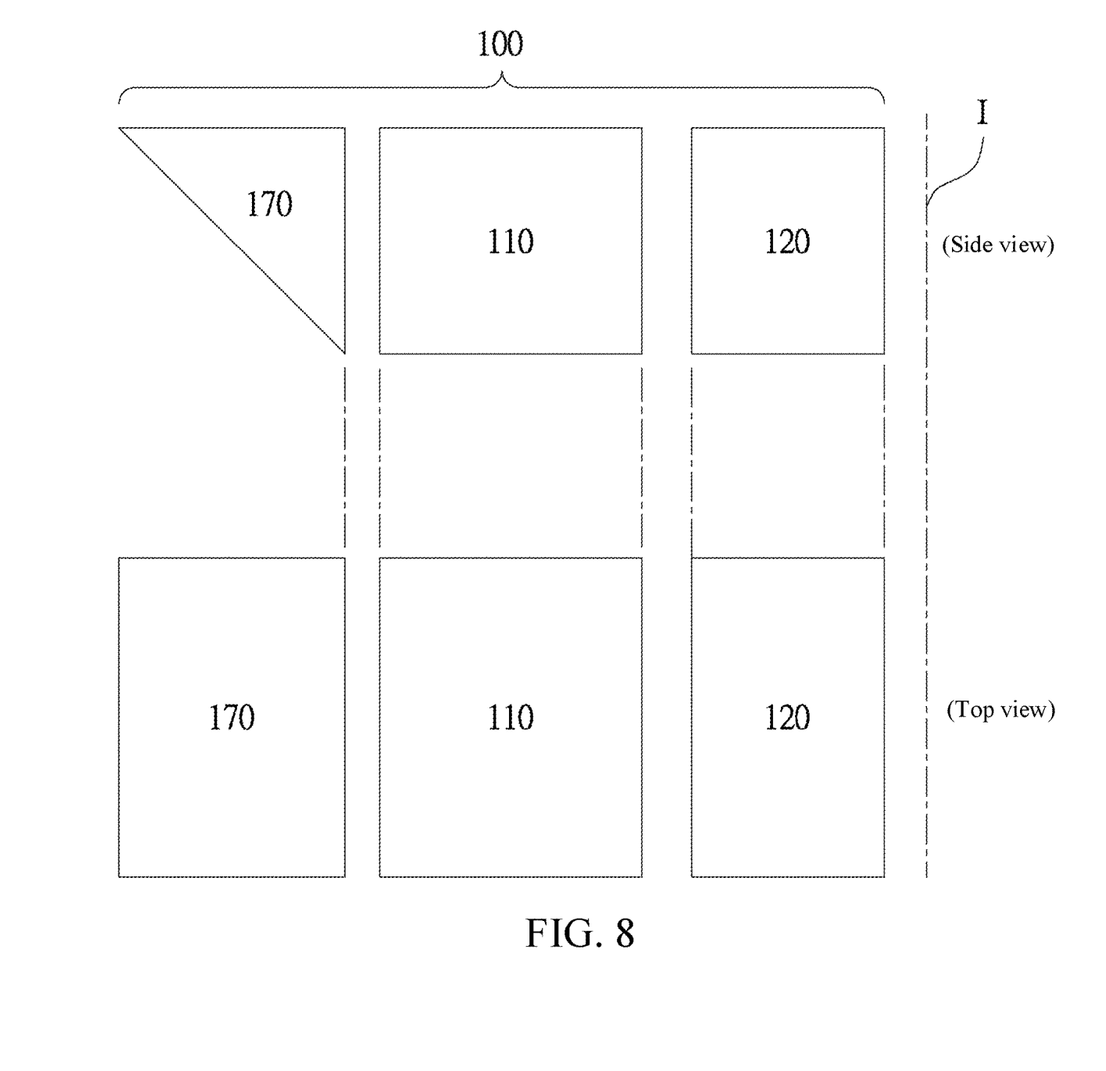
FIG. 8 and FIG. 9 are schematic diagrams of arrangement of a fixed lens set and a movable lens set according to the first and the second embodiments of this disclosure.
Figure 9:
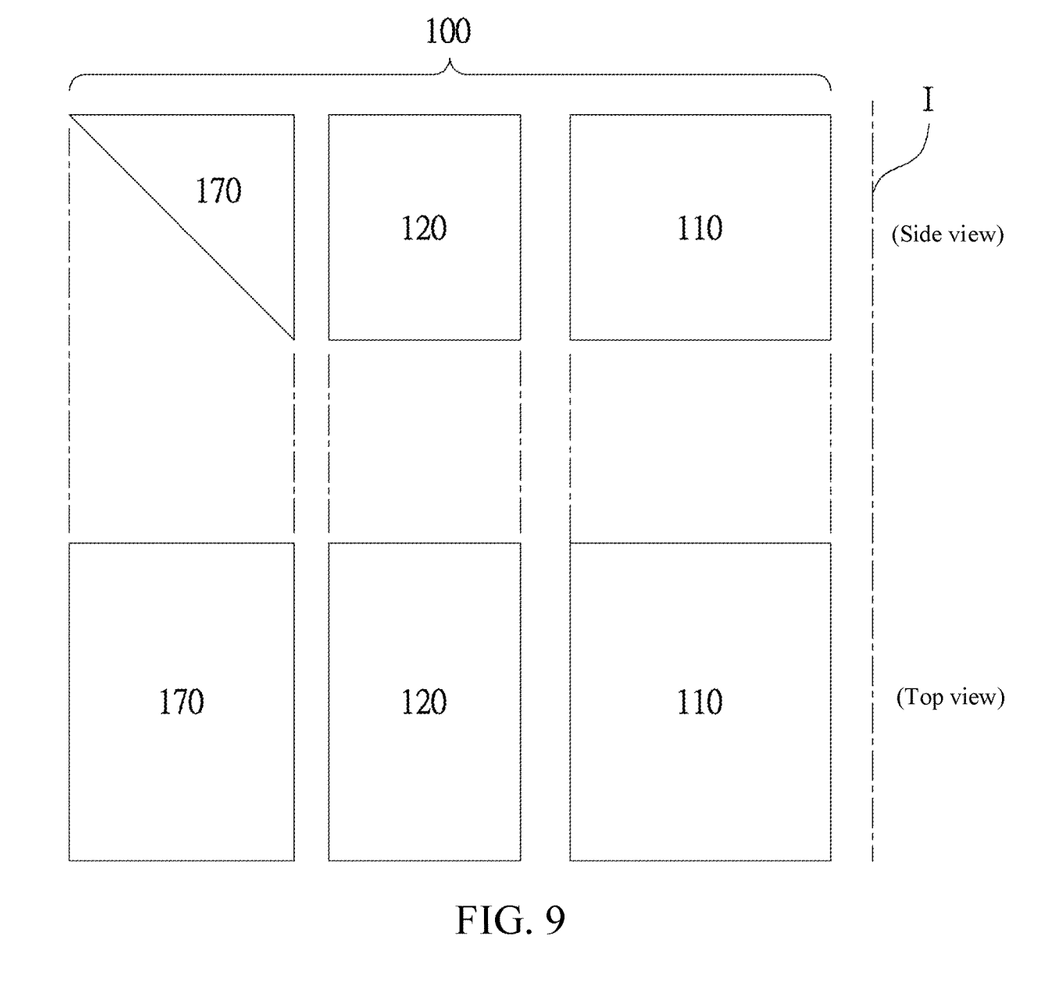

Referring to FIG. 8 and FIG. 9, in the first embodiment and the second embodiment, relative positions of the fixed lens set 110 and the movable lens set 120 may have various changes. The optical path changing element 170 shown in the drawings may be omitted when the image capture direction C and the actual image capture direction C' are the same.

As shown in FIG. 8, the movable lens set 120 may be located between the fixed lens set 110 and the imaging plane I, that is, the movable lens set 120 is located between the fixed lens set 110 and the image sensor 140. Therefore, when focusing, an optical lens set close to the image sensor 140 is moved to change a back focal length.

As shown in FIG. 9, the fixed lens set 110 may be located between the movable lens set 120 and the imaging plane I, that is, the fixed lens set 110 is located between the movable lens set 120 and the image sensor 140. Therefore, when focusing, an optical lens set away from the image sensor 140 is moved to change a front focal length.

Figure 10:
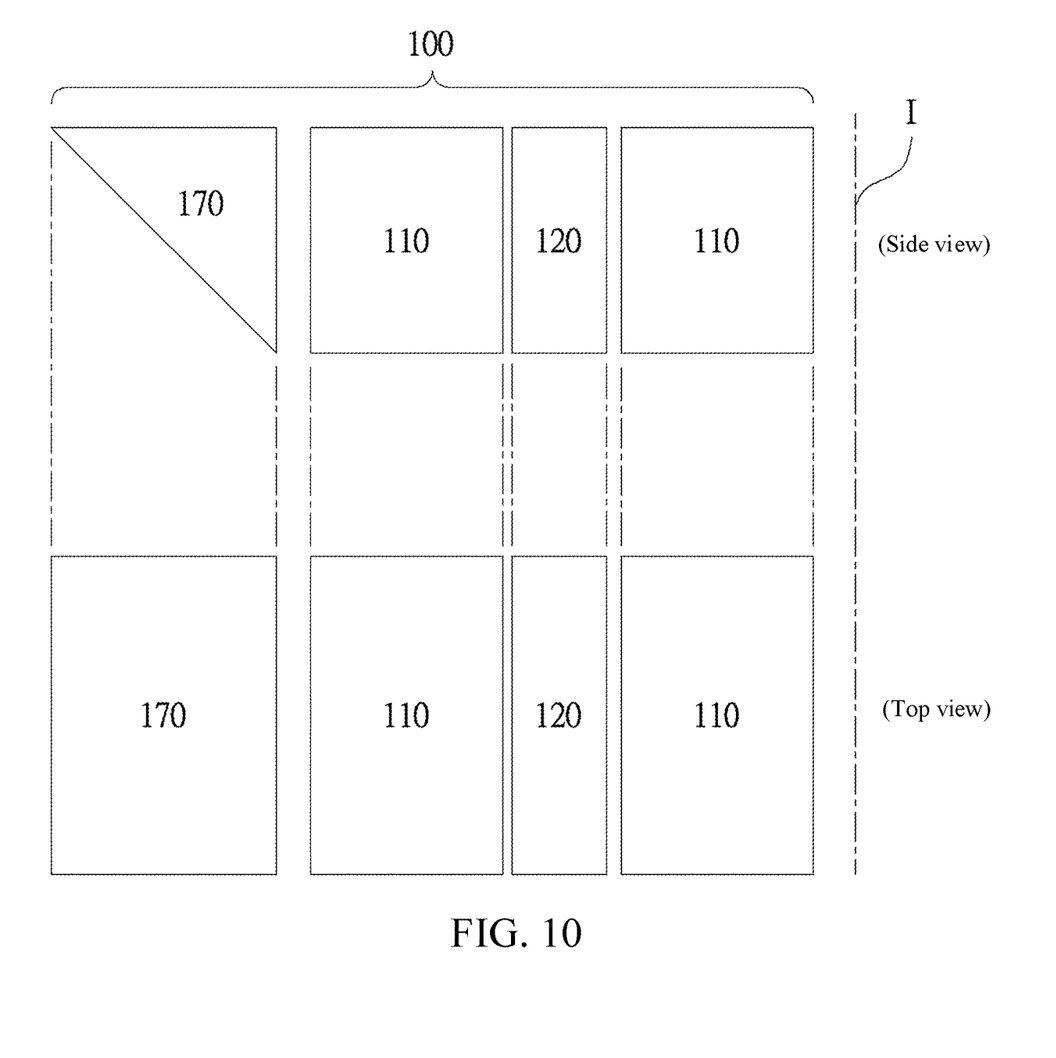
FIG. 10 is a schematic diagram of arrangement of a fixed lens set and a movable lens set according to a third embodiment of this disclosure.

FIG. 10 show an optical imaging apparatus 100 disclosed in a third embodiment of this disclosure. The optical imaging apparatus 100 includes two fixed lens sets 110 and one movable lens set 120. The optical path changing element 170 shown in the figure may be omitted when the image capture direction C and the actual image capture direction C' are the same. The movable lens set 120 is located between the two fixed lens sets 110. For movement of the movable lens set 120, an optical lens set located in the middle of the plurality of optical lenses is moved. Therefore, the movable lens set 120 can zoom in this case. In some embodiments, the two fixed lens sets 110 need not have the same optical lens composition. In some embodiments, the two fixed lens sets 110 need not have the same effective focal length.

Figure 11:
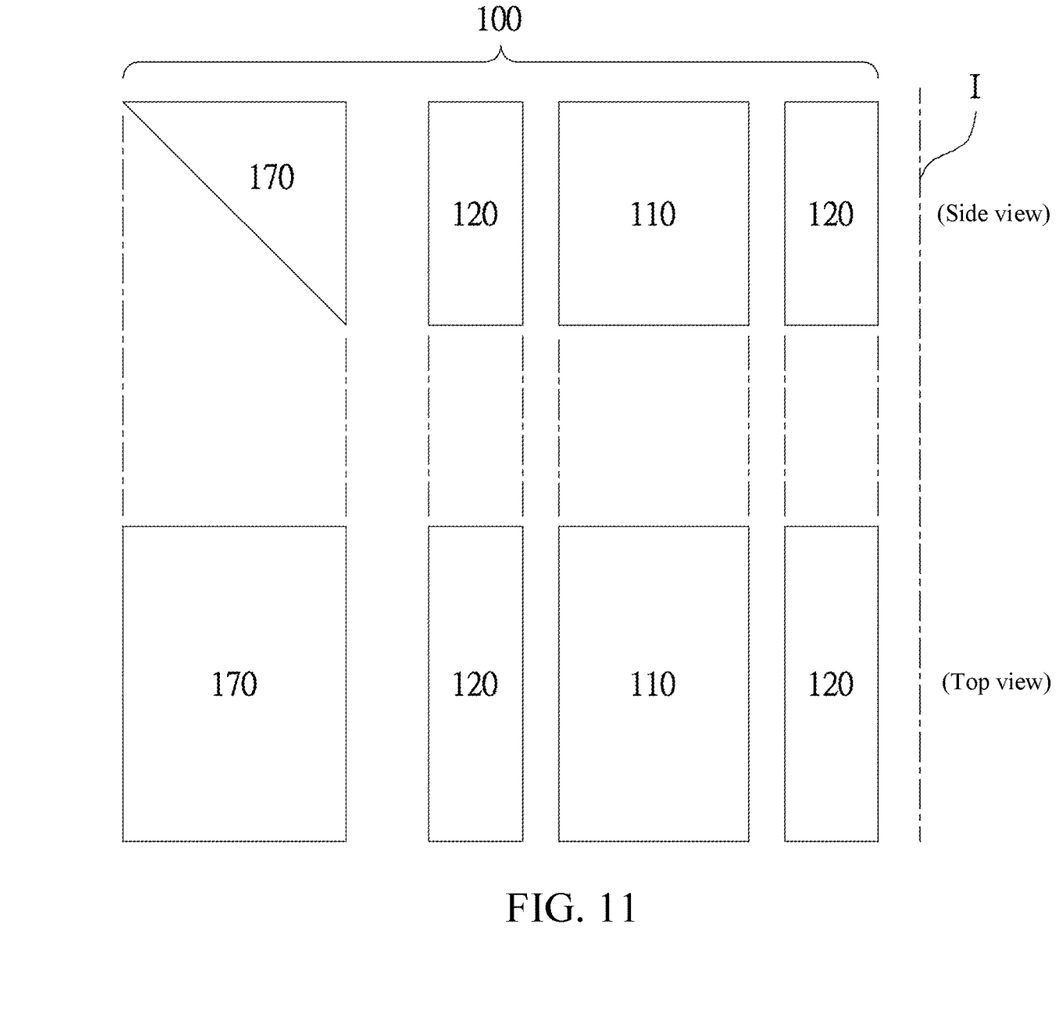
FIG. 11 is a schematic diagram of arrangement of a fixed lens set and a movable lens set according to a fourth embodiment of this disclosure.

FIG. 11 show an optical imaging apparatus 100 disclosed in a fourth embodiment of this disclosure. The optical imaging apparatus 100 includes one fixed lens set 110 and two movable lens sets 120. The optical path changing element 170 shown in the figure may be omitted when the image capture direction C and the actual image capture direction C' are the same. The fixed lens set 110 is located between the two movable lens sets 120. When focusing, optical lens sets located at front and rear of the plurality of optical lenses are moved, and a front focal length and a back focal length are also changed. In some embodiments, the two movable lens sets 120 need not have the same optical lens composition. In some embodiments, the two movable lens sets 120 need not have the same effective focal length.

Figure 12:
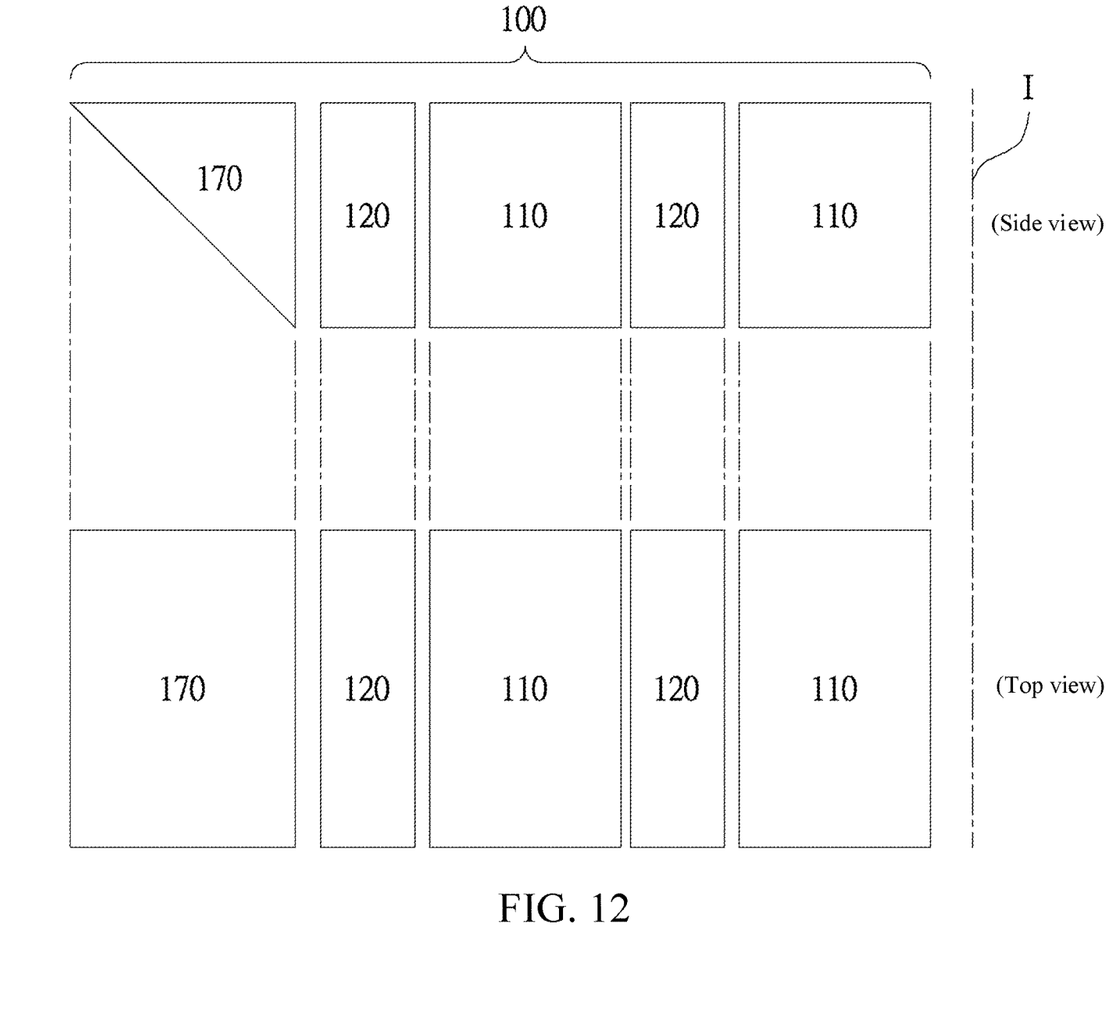
FIG. 12 and FIG. 13 are schematic diagrams of arrangement of a fixed lens set and a movable lens set according to a fifth embodiment of this disclosure.
Figure 13:
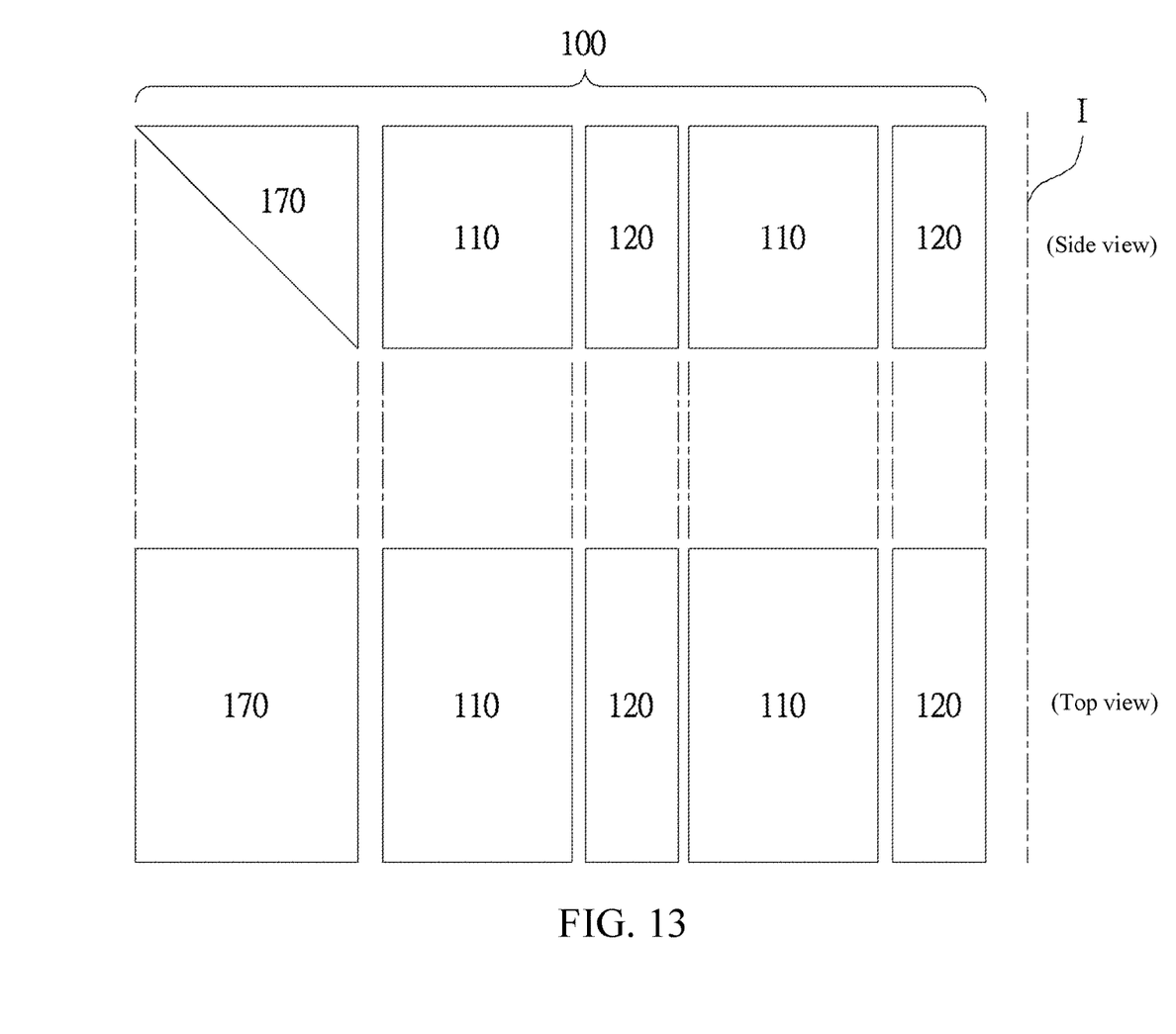

FIG. 12 and FIG. 13 show an optical imaging apparatus 100 disclosed in a fifth embodiment of this disclosure. The optical imaging apparatus 100 includes a plurality of fixed lens sets 110 and a plurality of movable lens sets 120. The optical path changing element 170 shown in the figure may be omitted when the image capture direction C and the actual image capture direction C' are the same. The arrangement of the fixed lens set 110 and the movable lens set 120 shown in the drawings are merely an example, and other arrangement sequences are also possible. When focusing, only the movable lens set 120 needs to be moved without simultaneously moving all of the optical lenses. In addition, according to an actual imaging requirement, merely the movable lens set 120 located between the two fixed lens sets 110 in the plurality of movable lens sets 120 needs to be moved to achieve a zooming effect, instead of simultaneously moving all of the plurality of the movable lens sets 120 for focusing or zooming. In some embodiments, the plurality of movable lens sets 120 need not have the same optical lens composition. In some embodiments, the plurality of movable lens sets 120 need not have the same effective focal length.

In one or more embodiments of this disclosure, the numbers of the fixed lens set 110 and the movable lens set 120 or the arrangement sequence on the optical axis L may vary arbitrarily, and are not limited to the numbers and the arrange orders shown in FIG. 8 to FIG. 13. In particular, moving movable lens sets 120 at different positions can achieve different optical adjustment effects. For example, changing the front focal length or the back focal length can focus on objects with different object distances, and changing the relative position of the movable lens set 120 between the two fixed lens sets 110 can achieve zooming.

In this disclosure, the plurality of optical lenses are divided into a plurality of sets. During adjustment of optical characteristics, only the movable lens set 120 in the plurality of optical lenses is moved. A weight of the movable lens set 120 or a movement displacement required for the adjustment of the optical characteristics is less than a weight of the entire optical lens set or an entire required movement displacement. Therefore, a driving force that the actuator 130 needs to provide for moving the movable lens set 120 is less than a driving force required for moving the entire optical lens set, so that a size of the actuator 130 can be effectively reduced, thereby reducing an overall size and an overall weight of the optical imaging apparatus 100. In addition, because the driving force that the actuator 130 needs to provide is reduced, a driving current required by the actuator 130 can also be reduced, relieving power consumption of the optical imaging apparatus 100.

What is claimed is:

1. An optical imaging apparatus, comprising:
   a plurality of optical lenses arranged along an optical axis to capture an image in a first image capture direction and project the image on an imaging plane; wherein the plurality of optical lenses are divided into at least one fixed lens set and at least one movable lens set;
   wherein the at least one fixed lens set is fixedly disposed, and the at least one movable lens set is configured to move relative to the at least one fixed lens set;
   a lens width in a direction perpendicular to the optical axis of the at least one movable lens set is sequentially decrease to the imaging plane;
   an actuator connected to the movable lens set, wherein the actuator is configured to drive the movable lens set to move relative to the fixed lens set, and the movable lens set and the actuator form an adjustment module;
   a base assembles and fixes at least one fixed lens set and the adjustment module;
   a first lens frame configured to carry the fixed lens set, and the first lens frame assembled and connected to the base;
   a second lens frame configured to carry the movable lens set, wherein the actuator is connected to the second lens frame and fixed to the base, so that the movable lens set is assembled and connected to the actuator;
   a fixing frame is assembled and connected to the base; and
   an image sensor is disposed on the fixing frame and located on the imaging plane.

2. The optical imaging apparatus according to claim 1, wherein the at least one movable lens set is configured to move forward and backward on the optical axis relative to the at least one fixed lens set.

3. The optical imaging apparatus according to claim 1, wherein the at least one movable lens set is configured to move on a plane perpendicular to the optical axis relative to the at least one fixed lens set.

4. The optical imaging apparatus according to claim 1, further comprising a filter located between the optical lenses and the image sensor.

5. The optical imaging apparatus according to claim 4, wherein the image sensor and the filter are disposed on the fixing frame.

6. The optical imaging apparatus according to claim 1, wherein the actuator is selected from the group consisting of a voice coil motor, a shape memory alloy motor, a piezoelectric motor, and a combination of two or more thereof.

7. The optical imaging apparatus according to claim 1, further comprising an optical path changing element located in the first image capture direction of the optical lenses, wherein the optical path changing element is configured to change a light beam from travelling in a direction parallel to a second image capture direction to travelling in a direction parallel to the first image capture direction.

8. The optical imaging apparatus according to claim 7, wherein the optical path changing element is a reflective sheet and an included angle is defined between the reflective sheet and the first image capture direction.

9. The optical imaging apparatus according to claim 7, wherein the optical path changing element is a prism, the prism includes a light incident surface and a light emitting surface, the light incident surface faces the second image capture direction, the light emitting surface faces the optical lenses, and an included angle is defined between the light incident surface and the light emitting surface.

10. The optical imaging apparatus according to claim 1, comprising two or more of the fixed lens sets, each of the fixed lens sets having a different effective focal length.

11. The optical imaging apparatus according to claim 1, comprising two or more of the moveable lens sets, each of the moveable lens sets having a different effective focal length.

* * * * *